Oct. 31, 1961     H. C. EBERLINE     3,006,238
DIFFERENTIAL DENSITY X-RAY FILM ANALYZER
Filed Aug. 31, 1956
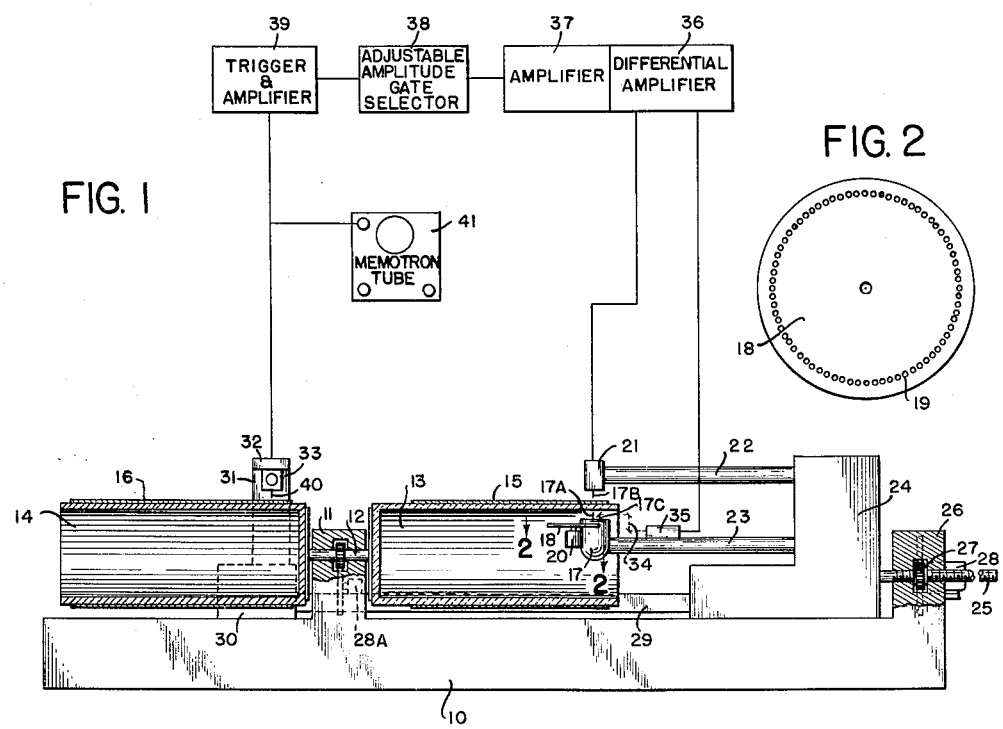
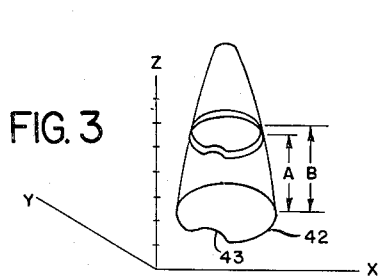
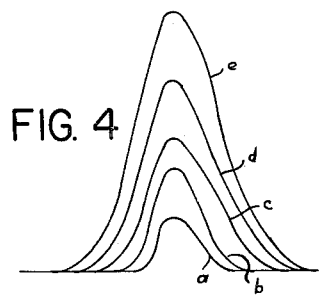
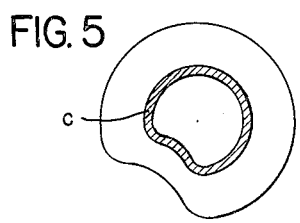
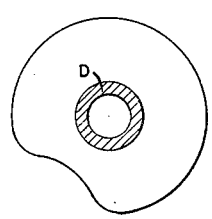
INVENTOR
H.C. EBERLINE
BY     ATTORNEYS ये
United States Patent Office 3,006,238
Patented Oct. 31, 1961

3,006,238
DIFFERENTIAL DENSITY X-RAY FILM ANALYZER
Howard C. Eberline, Santa Fe, N. Mex., assignor to Eberline Instrument Division of Reynolds Electrical and Engineering Co., Inc., Santa Fe, N. Mex.
Filed Aug. 31, 1956, Ser. No. 607,515
11 Claims. (Cl. 88—14)

The present invention relates to apparatus and a method of assisting in interpreting images on pictures of scenes and images on an X-ray film and, more particularly, to equipment and method for measuring the density of pictures, shadows and dark and light places on scenes, and density of exposure of such X-ray film whereby the skilled technician may interpret the results to assist in the diagnosis of diseased tissue, and the like.

Heretofore, it has been customary to read X-ray films by exposing the developed X-ray film to direct light transmitted through such film, and the reading of the images of the film has been entirely dependent upon the visual acuity of the observer. The doctors who normally read such X-ray films have varying degrees of experience and with the increase of experience the visual acuity frequently drops thereby making it difficult for an experienced practitioner to read the X-ray while the younger doctors with less experience and better vision may be able to read the X-rays but lack the experience to interpret the results thereof. Consequently, the use of X-rays is not as satisfactory as it could be and accordingly there is need for more positive means for reading and interpreting the images on X-ray films.

The human eye varies in its visual acuity and the iris has appreciable control over the amount of light passing into the retina of the eye, but the iris control is not sufficiently exact so that the observer can distinguish variations in density of exposure on the X-ray films within sufficiently narrow limits to bring out the desired information on such films.

It is therefore an object of the present invention to overcome the difficulties in reading X-ray film and to provide an apparatus and a method by which such reading can be greatly facilitated for obtaining more exact and complete information.

Another object of the present invention is to provide apparatus which will accurately measure differences in densities of the exposure of X-ray film, locate the portions of film of a specific density, and draw the configuration of such portion of film of a specific density to indicate the shape of the material which causes such density characteristics in the X-ray film.

A further object of the invention is to provide apparatus for temporarily providing information as to the areas of film of specific density so that an observer may readily determine whether it is desirable to further consider such X-ray or such portions of a specific density.

Another object of the invention is to provide mechanical control for apparatus which will form and accurately maintain separate images of areas of preselected density in a film.

A further object is to provide apparatus and a method for obtaining definite indication of areas of a scene, picture, or of a film in which a preselected density or densities will be recorded in a diagram in the identical relation which such selected density or densities occupy whereby the resulting diagram will be useful in interpreting the original picture, scene, or film.

Other objects and advantages of the invention will be apparent from the following description taken in conjunction with the accompanying drawing wherein:

FIG. 1 is a longitudinal transverse section of one form of apparatus including schematic diagram of electronic circuits and equipment for measuring and recording the differential in density of X-ray film;

FIG. 2, an enlarged detail of an interrupter disk used to interrupt the passage of light through the film being read;

FIG. 3, a diagrammatic three dimensional illustration of the density of the image relative to the area of image;

FIG. 4, a diagrammatic showing of how various materials and elements affect the density of the image on the X-ray film to illustrate how the composite image on the film is obtained;

FIG. 5, an enlarged diagrammatic illustration of results of processing a developed X-ray film by the present method and apparatus to separate the portions of the image having a predetermined density within a narrow range and showing how such densities on the film would appear within the density range shown in FIG. 3; and FIG. 6, a further illustration on an enlarged scale similar to that of FIG. 5 and showing a section of different preselected density on the portion of the film, the density of which is illustrated in FIG. 3.

Briefly, the present invention provides apparatus and method for interpreting a picture, scene, and X-ray films and comprises a transparent support for a developed X-ray film or picture with means to move the support over a definite path, the support preferably being in the form of a hollow transparent cylindrical drum rotatably mounted on its axis and within such drum a source of collimated light is projected outwardly through the drum and film while a rotatably mounted disk having a plurality of small openings is rotated at a definite speed to periodically interrupt the flow of light. On the outside of the drum a photo tube with suitable amplification means is arranged to receive the rays of collimated light passing through the film and to be periodically energized as the scanning disk interrupts the beam of collimated light. The amount of light passing through the film varies as the density of such film varies, so that less light passes through the film where the film is more dense and more light passes through the film where the film is less dense.

The intensity of the source of light may vary slightly and to compensate for such variation a differential amplifier is provided to take care of such variations while the photo tube is provided with suitable amplification means to increase the signal which forms an alternating current so that such signal can be increased, and after amplification the signal is controlled through an adjustable amplitude gate selector which is electronically arranged to permit a limited range of signals corresponding to a limited range of densities in the film to operate a trigger and amplifier and from such trigger and amplifier the signal is recorded on a Memotron tube corresponding to an oscilloscope tube similar to a television tube but which retains the image on the screen for a longer time to permit reading.

Simultaneously with, or as a substitute for the Memotron tube, a gas discharge tube is arranged to direct collimated light on an area of a photo-sensitive material such as photographic paper, which photographic paper is mounted on a movable support which is preferably a drum similar to the drum supporting the film and such collimated light from the gas discharge tube exposes such photographic paper in an area corresponding to the area being scanned by the collimated light from the source of light passing through the X-ray film and since the adjustable amplitude gate selector controls the particular signal corresponding to a particular limited range of densities on the X-ray film, the image formed on the photographic paper gives a clear indication of the shape which would be indicated by this particular range of densities in the X-ray film. By taking X-ray pictures at a 90° angle to a previously taken picture and by properly interpreting the reproductions of the areas of particular densities the skilled observer of such X-rays and the reproductions of specific densities can more definitely establish the outline of suspected abnormalities in the subject through which the X-ray is taken, thereby facilitating the diagnosis of diseases and the detection of flaws or imperfections in objects of various kinds. Obviously, various studies of objects can be made by the apparatus and method of the present invention.

From the above it will be apparent that an image of a film, picture or scene is scanned from a source of radiation and in accordance with the small area scanned at a particular instant the density of such small area is reproduced on a diagram which is shown to be made on photographic paper. Only the preselected density or densities are recorded on the diagram in the particular location which corresponds to the area of the preselected density or densities. The preselected density is determined by the adjustment of the adjustable amplitude gate selector which provides a lower and upper limit for each selected density to be reproduced as a contour line on the diagram.

Referring more particularly to the drawing, one form which the apparatus may take is illustrated in FIG. 1, in which a heavy base 10 such as the bed of a lathe fixedly supports an upright member 11 in which a shaft 12 is rotatably mounted on accurately machined bearings, such shaft having a first drum 13 of transparent material fixed to one end thereof so that both drums will rotate in unison, suitable means being provided to secure a developed X-ray film 15 on the drum 13 and suitable means being provided to secure a photo-sensitive material such as photographic paper 16 on the drum 14.

The cylindrical portion of the drum 13 is made of transparent material to permit the passage of light therethrough while a source of light 17 is located within such drum 13 and such source of light is provided with a collimator 17A to provide control of such light so that such light moves in parallel beams through the drum 13 and through the film 15, such beams of light being of small transverse dimension such as approximately 5 to 10 mils in each transverse direction, and such beams of light passing radially through the drum 13 so that a minimum of distortion is caused by any lens effect on the passage of such light through the drum.

Suitably mounted adjacent the source of light 17 is a scanning disk 18 having a plurality of holes 19 therethrough, such disk 18 being driven by a synchronous motor 20 to interrupt the passage of light from the light source 17 through the film at predetermined intervals. A photo tube 21 is positioned outwardly of the drum 13 and receives the collimated light being transmitted from the source of light 17 through a collimator 17B and the intensity of such light received by photo tube 21 varies oppositely with the increase in density of the film. The photo tube 21 is preferably of the photo multiplier type which may include nine dynodes for amplifying the signal of light, the interrupted signal of light on the photo tube 21 causing the formation of alternating current. The photo tube 21 and the source of light 17 are mounted in fixed relation to one another on horizontal supports 22 and 23, respectively, which horizontal supports are fixedly mounted on a slide member 24 which is adapted to slide on the lathe bed 10 being controlled by suitable means such as a screw 25 fixed to the slide and slidably mounted in an upwardly extending member 26 fixed to the lathe bed 10 while an internally threaded gear 27 will cause longitudinal movement of such threaded shaft 25, the gear 27 being rotated by suitable means such as a motor 28 in timed relation to the rotation of the shaft 12 and the drums 13 and 14 thereon. The shaft 12 and drums 13 and 14 carried thereby are rotated by suitable means such as gearing from the motor 27 or by means of a separate motor 28A driving a gearing connected to shaft 12.

Extending laterally from the slide 24 is a rod 29 fixed to such slide and extending to a second slide 30 which is slidably mounted on the bed 10 and carries an upright column 31 supporting a suitable bracket 32 or the like which carries a gas discharge tube source of light 33 with a collimator 40 which directs collimated light against the photo-sensitive paper 16 on the drum 14 in an area corresponding to the area being scanned on the film 15 by the collimated light from the light source 17.

The light source 17 provides the light beams passing through the collimator 17A which passing through the glass cylinder 13 and film 15 being received by collimator 17B from which the light beams pass to the photo tube 21.

To compensate for the variations in the intensity of light in the light source 17A another collimator 17C directs light to a system of mirrors which directs the light along the dotted line path 34 to a photo tube 35 which controls the differential amplifier 36 to compensate for the variations in the light intensity from the source 17 and thereafter the differential amplifier 36 gives an accurate determination of the density of the portion of the film through which the collimated light passes from light source 17 to collimator 17A to 17B to the photo tube 21.

Any diffusion of the light caused by the lens effect of the cylindrical shape of drum 13 is uniform throughout and the portion of the drum through which the light is projected is such a small increment which approaches a chord as a limit that any diffusion or dispersion resulting from the lens effect of such drum is believed to be negligible.

The output of the differential amplifier 36 is amplified through an amplifier 37 and by means of an adjustable amplitude gate selector 38 the range of densities which will provide the proper impulses can be selected to actuate a trigger and amplifier unit 39 and such trigger and amplifier unit serves to control the gas discharge tube 33 so that when portion of the X-ray film being scanned has the density within the selected range said gas discharged tube 33 is lighted so the light therefrom passes through the collimator 40 associated therewith onto the corresponding portion of the photographic paper 16 thereby exposing the sensitized paper 16 in accordance with the selected range or ranges of density to be taken from the X-ray film. The trigger and amplifier 39 acts as a switch to cause the gas discharge tube 33 to produce light beams or to be extinguished. Such trigger and amplifier unit may be used to produce an image on a Memotron tube 41 which is an oscillograph tube similar to a television tube which retains the image thereon for as long a time as desired. This Memotron tube may be used to obtain a diagram of areas which have equal density within a selected range or a diagram which shows several different densities with each density of a selected adjustable value thereby making a diagram representing the selected areas of predetermined density independently of the diagram or image formed on the sensitized paper 16 or in addition to the diagram or image formed on the sensitized paper whereby a more rapid reading may be obtained without requiring development of the image on the photographic paper. When both the Memotron tube and the photographic paper have images formed thereon, a permanent record is obtained on the sensitized paper while a progressive record is immediately observable on the Memotron tube and the useful reading of the density record can be made by the observer more readily.

It will be evident that the density or opaqueness or resistance to the passage of light through an X-ray film varies from place to place and point to point on the film. This density is measured in terms of density units which density units correspond to the log of the attenuation of transmission of light through the film. With the present apparatus the density of a film can be measured to within 1/100th of a density unit and this apparatus can distinguish differences in the order of 1/100th of the difference in densities which can be distinguished with the naked eye. Particularly when the image of the film becomes more dense, the difficulty in reading any difference in density increases, but with the present apparatus the difference in density can be accurately measured and recorded.

Referring to FIG. 3, the diagram therein represents a three dimensional illustration of a generally circular portion of an X-ray film corresponding to a circular area 42 having a notch 43 at a front edge thereof, the X and Y axis corresponding to the width and length of such portion of the film, and the density of such portion of the film being represented by vertical measurements along the Z axis. The resulting figure for the assumed density area formed by the circle 42 and notch 43, resulting in a generally conical shaped figure based on the assumption that the densest portion of the selected circular area 42 of the film is at the center thereof and that the adjacent portions of the X-ray film are substantially transparent. In looking at such a portion of the X-ray film the center would appear to be extremely black or dense and the edges would gradually become lighter but it would be practically impossible to distinguish the difference in density between closely adjacent portions of such area 42 with the naked eye. However, with the present apparatus the adjustable amplitude gate selector 38 may be adjusted so as to select densities which vary within narrow limits.

In FIG. 3, the vertical dimension B on the Z axis corresponds to the selected upper limit of density or maximum degree of blackness while the vertical dimension A corresponds to the lower limit of density or minimum degree of blackness to be reproduced and therefore the portion of the film which has a density between the values of B and A will serve to actuate the trigger and amplifier 39 and light the gas discharge tube and produce an image on the Memotron tube. The image formed on the photosensitive paper 16 and on the Memotron tube corresponds to the portion of the X-ray film having a density in the range between density A and density B, which image is illustrated in FIG. 5 as the shaded portion C and would be the image of that particular area of the X-ray film which would be reproduced on the photographic paper 16 and on the Memotron tube.

The shaded portion D in FIG. 6 is the image which would result from a greater density indicated by a height above A or B on the density cone shown in FIG. 3 and would correspond to a different selected density and as shown would be of somewhat different shape in that portion of the density cone illustration as the top of such density cone is assumed to be circular in section. It will be evident that the density of various parts of an X-ray film will vary and the illustrations shown in FIGS. 3 to 6 are only by way of example.

FIG. 4 is intended to illustrate the effect of various components of a body through which an X-ray is taken, for example, the density in an X-ray film may result from a first layer of skin or the like which would result in a density as indicated by "a," and in the same X-ray film the density in the film would be increased because of a bone through which the X-ray passes, such density or bone being that difference between "a" and "b," and assuming that a second bone is also in the path of the X-ray, such second bone would increase the density by the amount between "b" and "c," and farther penetration of the X-ray through a muscle or the like might result in a density corresponding to the difference between "c" and "d," and the layer of skin on the opposite side might result in the difference in density between "d" and "e," the lines $a$, $b$, $c$, $d$, and $e$ being intended to graphically represent the various densities that would be encountered in an ordinary X-ray. This figure is analogous to vertical sections taken through the density cone illustration of FIG. 3 to explain the Z dimensions on the three dimensional graph resulting in the density cone shown in FIG. 3.

Since the adjustable amplitude gate selector 38 can be varied as conditions require, it will be evident that various parts of an X-ray film may be recorded where such portions of the X-ray film are of a uniform density within narrow limits and if the X-ray film is through a region having gall stones, kidney stones or the like, it is believed to be a simple matter to separate out the density which would indicate the presence of such stones since the photo-tube 21 is much more sensitive than the human eye and the image formed on the Memotron tube 41 and/or on the photographic paper 16 is in black and white presenting a clear outline of such portions of the picture, scene, film, or X-ray film within a given density permitting accurate interpretation of such black and white images by the observer or physician.

It will be apparent that a single picture or film may be scanned several times to obtain several density contours or several different density contours may be obtained in a single scanning by suitable adjustment of the adjustable amplitude gate selector or other suitable gating means.

The adjustable amplitude gate selector may have characteristics to cause two or more different densities to actuate the gaseous discharge tube 33 and expose other portions of the photographic paper and the Memotron tube to indicate the two or more selected different areas of selected different constant densities, and that a plurality of densities can be plotted on a single diagram to give additional information regarding the picture, scene or film being scanned.

It will also be apparent that the present invention is useful in reading X-rays taken of other materials and objects including metal and wood to detect the presence of flaws therein, thereby providing for greater safety in the use of structural materials since the present invention would assist in detecting the flaws before such flaws could cause damage thereby preventing injury to persons and avoiding economic loss resulting from delays and accidents.

From the above description it is believed that the advantages of the present invention should be apparent and the usefulness of the invention and the manner of using the same for obtaining additional information over what may be obtained at present should be obvious.

It will be obvious to those skilled in the art that various changes may be made in the invention without departing from the spirit and scope thereof and therefore the invention is not limited by that which is illustrated in the drawing and described in the specification, but only as indicated in the appended claims.

I claim:

1. Apparatus for producing solid line, contour diagram representing portions of an image within selected specific optical density limits between a selected precise upper limit of density and a selected precise lower limit of density, said image having varying densities over a range encompassing said upper and lower limits, comprising means to progressively scan the image with a first beam of radiant energy, means to produce a signal in response to said first beam of radiant energy proportional to the density of the portion of the image being scanned, means responsive to said signal for selecting only portions of said signal which are representative of the densities of the image between said upper and lower limits, means to progressively scan a photosensitive element with a second beam of radiant energy, means responsive to said selected portions of said signal to activate and extinguish said second beam of radiant energy, whereby solid line contours are produced by said second beam of radiant energy on said photosensitive element and accurately represent the said portions of the image of the selected specific density between the selected precise upper and lower limits and whereby a diagram representing information contained in said portions of the image having the selected specific density between the selected precise upper and the selected precise lower limits can be accurately obtained.

2. The invention according to claim 1 in which means are provided for compensating for variations in the strength of the first beam of radiant energy whereby the signal from the second beam of radiant energy will not be affected by usual variations in the strength of the first beam of radiant energy.

3. The invention according to claim 1 in which the beams of radiant energy are visible light.

4. The invention according to claim 1 in which the contour diagram is formed on a photosensitive element which can be immediately observed after one scanning.

5. The invention according to claim 1 in which the scanning is progressively accomplished making a permanent record.

6. The invention according to claim 1 in which the means responsive to said signal for selecting only portions of said signal include an adjustable amplitude gate selector.

7. The invention according to claim 6 in which a trigger and amplifier is operated by the signal passing the adjustable amplitude gate selector to activate and extinguish said second beam of radiant energy.

8. The invention according to claim 1 in which mechanical means are provided to relatively move the photosensitive element and the second beam of radiant energy.

9. The invention according to claim 1 in which mechanical means are provided for relatively moving the image and the first beam of radiant energy.

10. The invention according to claim 1 in which the scanning of the image is by means of transmitted light.

11. Apparatus for producing a record of particular range of densities in an X-ray film comprising a transparent platen for supporting the X-ray film, a first source of light forming a beam of limited area on one side of the platen, a device for periodically interrupting said first source of light, a first photo-electric cell on the other side of the platen for receiving the beams of interrupted light, a second platen on which photographic paper may be mounted, means to move said first and second platen in substantially identical directions, a second source of light mounted to direct rays of light on photographic paper on the second platen for producing an image thereon, a second photocell to measure the intensity of the source of light to said first platen, a differential amplifier responsive to the output of said first and second photocells, said differential amplifier producing an output which is proportional to the difference in light intensity measured by said photocells, an adjustable amplitude gate selector and trigger and amplifier coupled to the output of said differential amplifier for controlling the light from said second source to said second platen to thereby produce regions on said photographic paper which will correspond to regions within a definite range of density in the X-ray film whereby an observer of the paper can accurately know the extent of the areas on the film corresponding to the selected range of densities as controlled by the adjustable amplitude gate selector.

References Cited in the file of this patent

UNITED STATES PATENTS

| | | |
|---|---|---|
| 2,250,730 | Stewart et al. | July 29, 1941 |
| 2,294,643 | Wurzburg | Sept. 1, 1942 |
| 2,500,547 | Kalmus et al. | Mar. 14, 1950 |
| 2,549,402 | Vossberg | Apr. 17, 1951 |
| 2,626,989 | Brown | Jan. 27, 1953 |
| 2,645,971 | Herbst | July 21, 1953 |
| 2,773,414 | Green | Dec. 11, 1956 |

OTHER REFERENCES

JOSA article, Fowler et al., vol. 43, page 63, January 1953.